Sept. 15, 1925.
F. A. COFFEEN
GRID MAKING MACHINE
Filed June 20, 1924 5 Sheets-Sheet 5
1,553,509
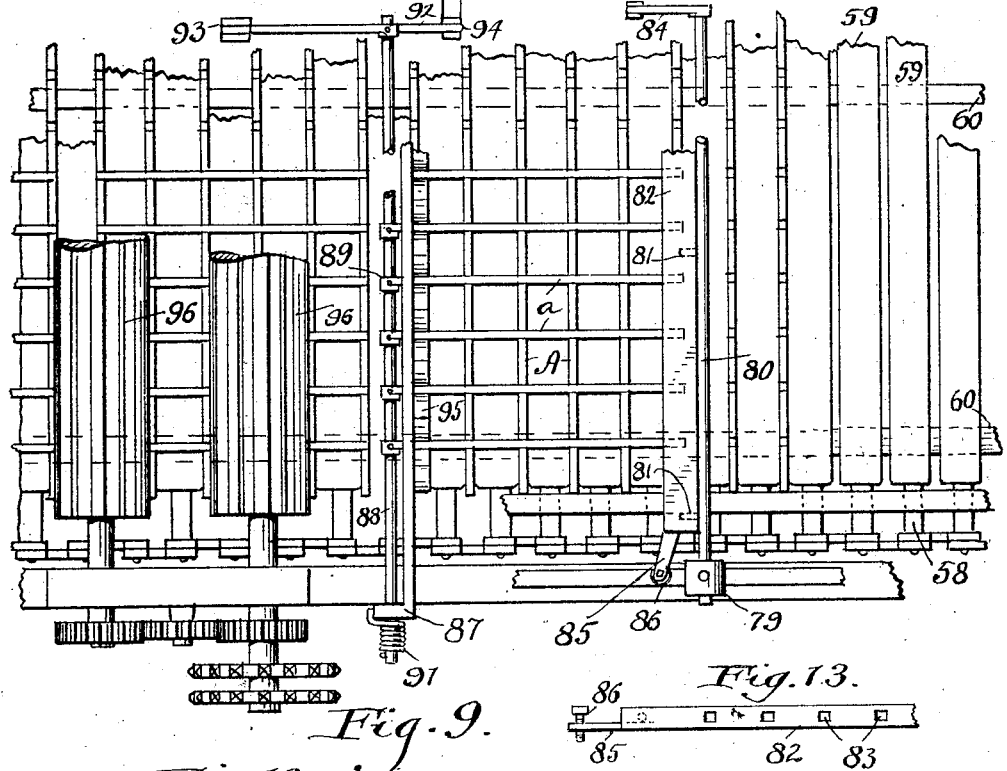
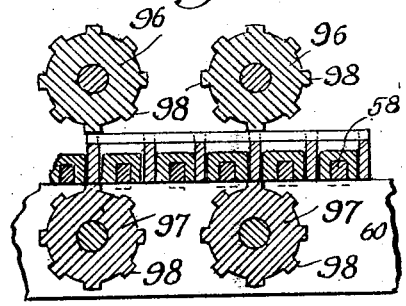
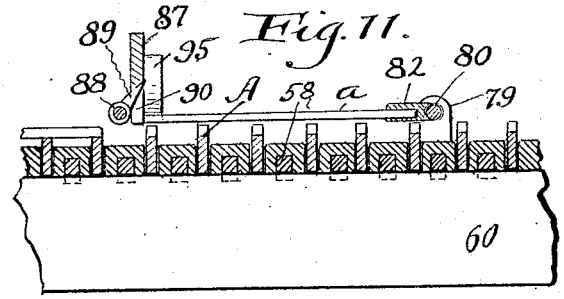
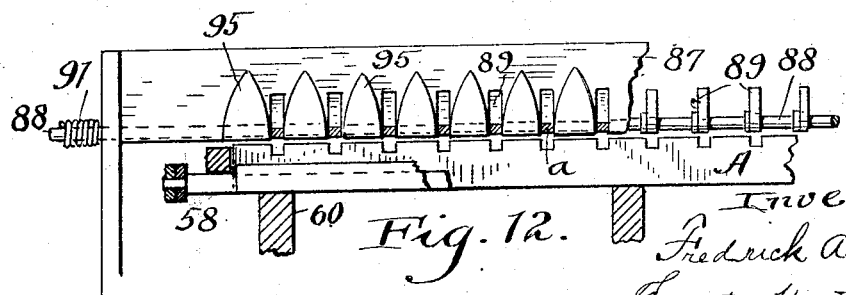
Inventor
Fredrick A. Coffeen
Thurston Know & Hudson
attys.

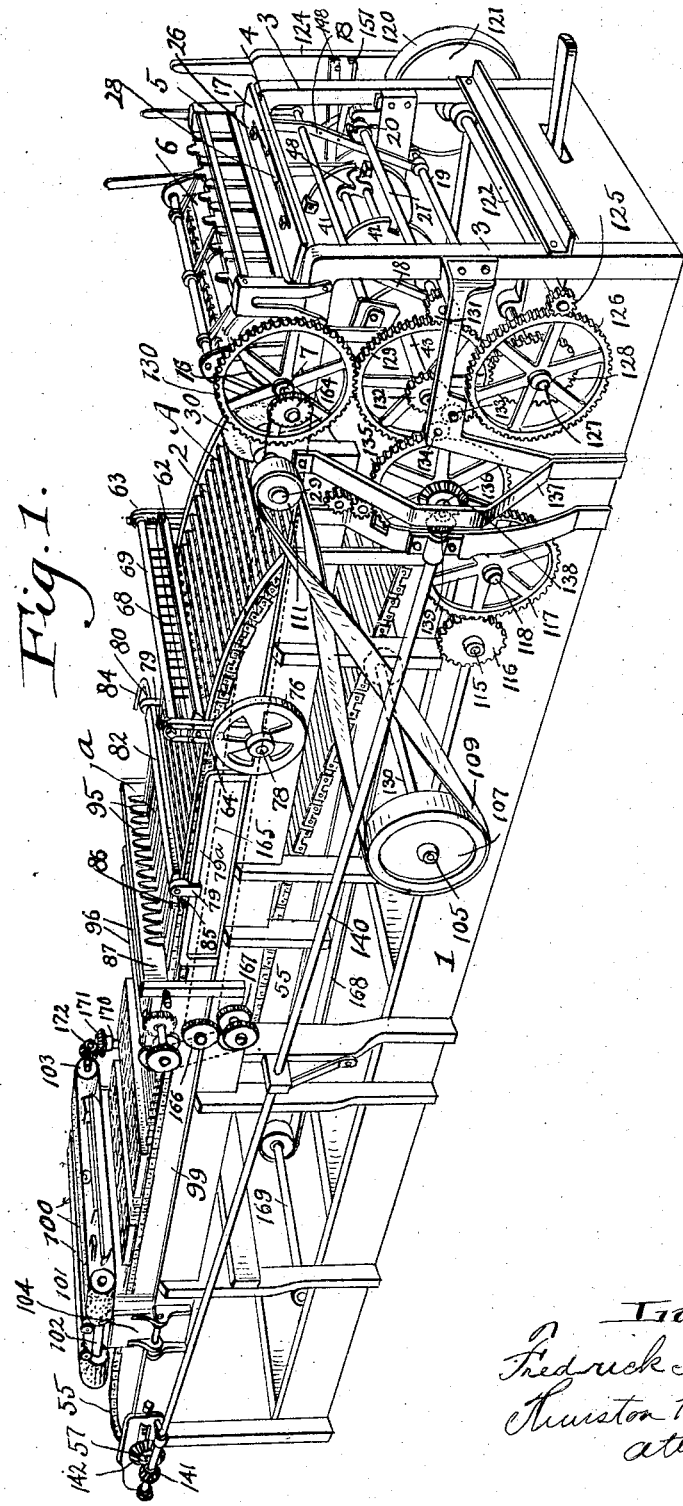

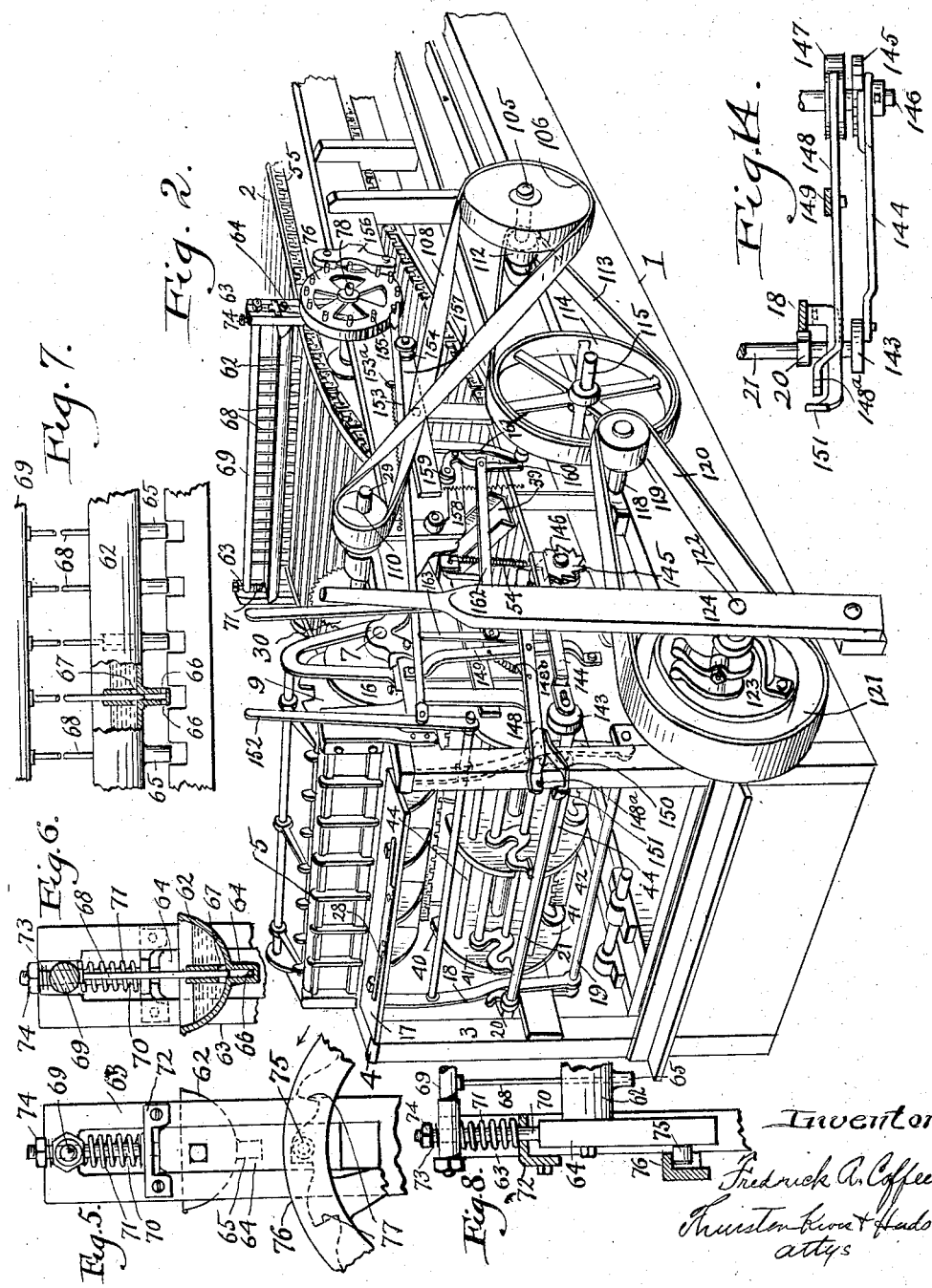

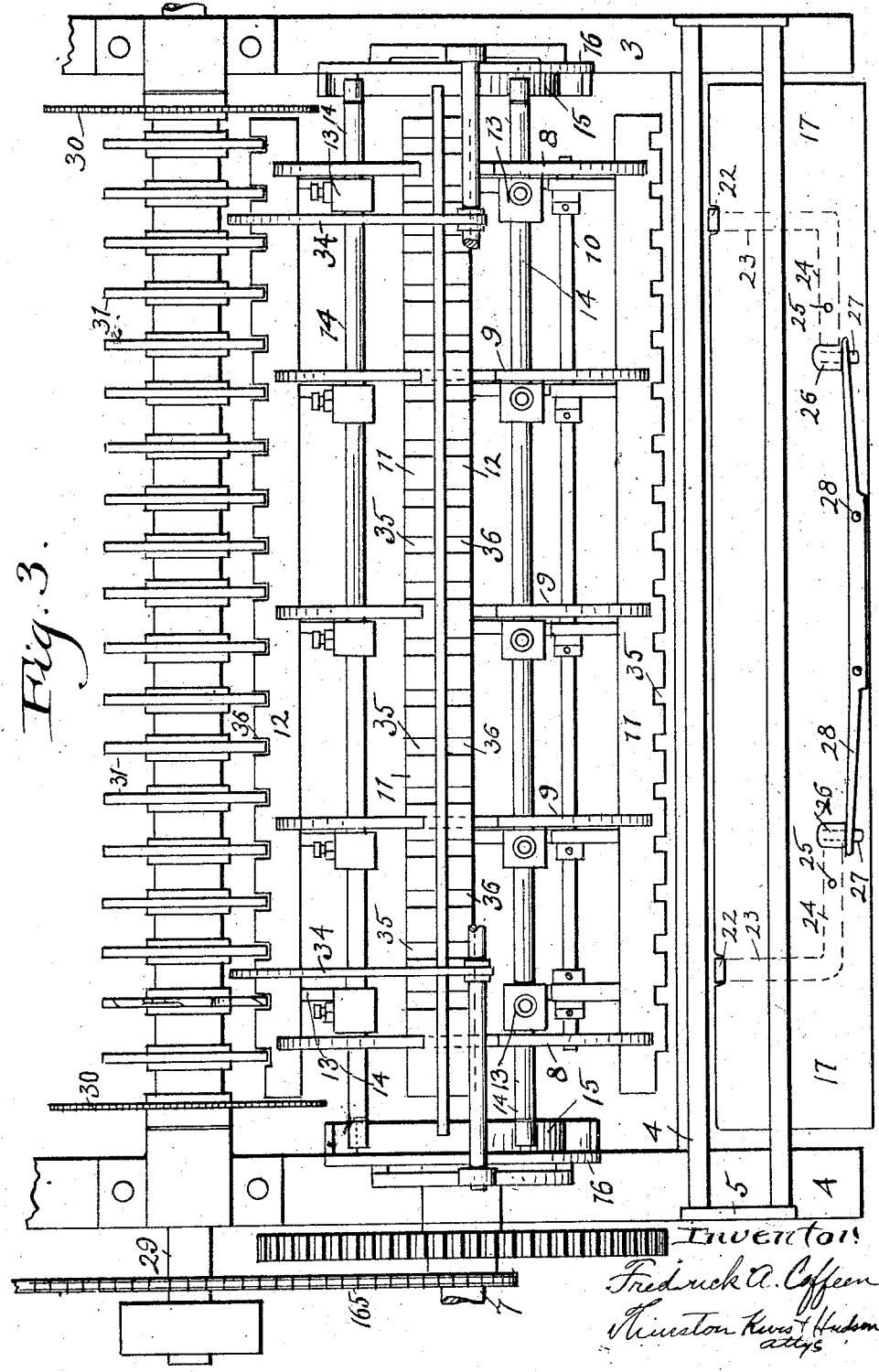

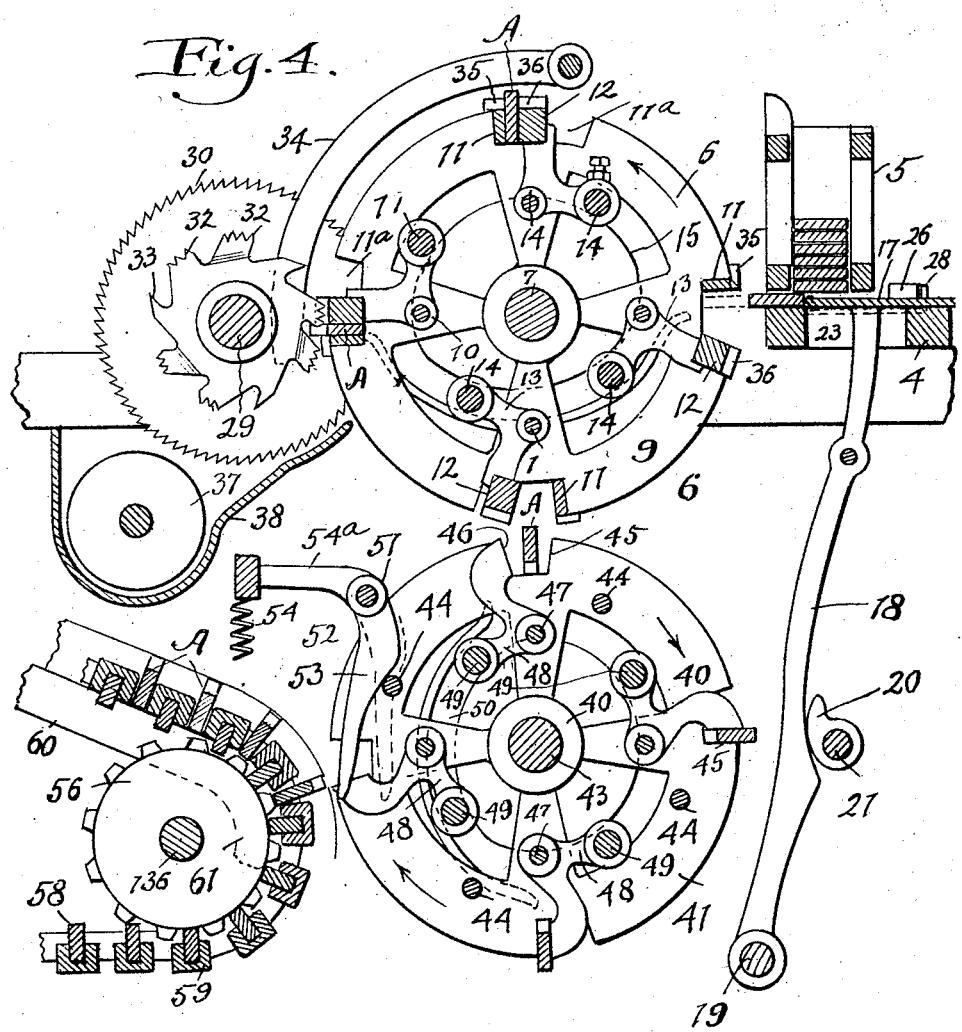

Patented Sept. 15, 1925.

1,553,509

UNITED STATES PATENT OFFICE.

FREDRICK A. COFFEEN, OF KENT, OHIO.

GRID-MAKING MACHINE.

Application filed June 20, 1924. Serial No. 721,314.

*To all whom it may concern:*

Be it known that I, FREDRICK A. COFFEEN, a citizen of the United States, residing at Kent, in the county of Portage and State of Ohio, have invented a certain new and useful Improvement in Grid-Making Machines, of which the following is a full, clear, and exact description.

This invention relates to a machine for making cold air frames or grids and similar articles and has for its object to provide a machine by which the parts of the grid may be formed, assembled and secured together in the form of a complete grid with a minimum of manual labor.

More specifically, the invention aims to provide mechanism for feeding the main slats of the grid from a suitable magazine, forming regularly spaced notches along one edge of each slat, assembling the notched slats in uniformly spaced parallel relation in groups of the desired number on an endless conveyor with the notched side of the slats uppermost, devices being disposed along the length of the conveyor for applying glue to the notches of the slats, for assembling the cross bars for each grid and inserting the cross bars in the notches of the slats, exerting pressure on the assembled grid to cause the cross bars to become firmly united to the slats and finally finishing the grid by abrading the top surface thereof by means of a sanding belt adjacent the discharge end of the conveyor.

With the above and other objects in view, the invention may be said to comprise the machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which Fig. 1 is a perspective view of the entire machine; Fig. 2 is a perspective of the front end portion of the machine looking toward the side opposite that from which Fig. 1 is taken; Fig. 3 is a top plan view of the forward end of the machine showing the slat magazine, the notching cutters, the sawing devices and the carrier which receives the slats from the magazine and feeds them past the notching cutters and saws; Fig. 4 is a vertical section through the forward end of the machine, the section being taken longitudinally of the machine; Fig. 5 is a detailed view showing the glue applying device in end elevation; Fig. 6 is a vertical transverse section through the glue container; Fig. 7 is a fragmentary front elevation of the glue feeding device; Fig. 8 is a sectional detail view showing the mounting of the glue pot supporting slide; Fig. 9 is a fragmentary top plan view of the device for assembling the cross bars and inserting the cross bars into the notches of the slats and the pressure rolls which act upon the assembled grid; Fig. 10 is a transverse section through the pressure applying rolls and the conveyor belt and grid passing therebetween; Fig. 11 is a sectional view taken transversely through the device for inserting the cross bars in the notches; Fig. 12 is a fragmentary front elevation of the positioning bar which serves to guide the cross bars into the notches of the slats; Fig. 13 is a fragmentary elevation of the cross bar assembling frame showing the opening in which the cross bars are inserted; Fig. 14 is a detail view showing the skip feed device; Fig. 15 is a fragmentary perspective of a completed grid.

Referring to the accompanying drawings, the entire mechanism is supported upon a relatively long frame work 1, the major portion of the length of which is occupied by an endless belt 2 which extends from the rear end of the frame to a point adjacent the front end thereof. The front end portion 3 of the frame, which is beyond the forward end of the conveyor, extends upwardly somewhat above the level of the belt and has at the top thereof a horizontal feed table 4 above which is supported a magazine 5 adapted to accommodate a pile of slats, the slats A being those which form the main or body portion of the grid. The slat magazine 5 is supported directly above the feed table 4 and the bottom thereof is spaced sufficiently above the feed table to permit the lowermost slat of the pile in the magazine to be pushed out from under the superposed slats, the clearance between the table and front and rear walls of the magazine being just sufficient to permit one slat to be fed from a magazine at a time. Immediately back of the feed table 4 there is mounted a feed drum 6 which is carried by a transverse shaft 7 journaled in the opposite sides of the frame. The feed drum 6 consists of end disks 8 and intermediate disks 9 which are fixed to the shaft 7 and which are rigidly connected by cross rods 10. The feed drum 6 is provided with a series of regularly spaced clamps at the periphery thereof which are adapted to engage and hold the slats fed to the drum. Each of the clamps consists of a fixed abutment or jaw 11 in the form of a bar rigidly secured to the disks 8 and 9 at one end of a peripheral notch 11ª and cooperating with the fixed jaw 11 is a movable jaw 12 which is supported for movement toward and from the fixed jaw 11 in the notches 11ª, the slat engaging portions of the jaws 12 being also in the form of bars extending the full length of the drum. The jaw 12 is carried by bell crank arms 13 which are pivoted at their bends to the rods 10 fixed to the disks 8 and 9 and extending longitudinally of the drum inwardly of the notches 11ª. The rearwardly extending arms of the levers supporting each of the jaws 12 carries a rod 14, the ends of which project into engagement with cams 15 formed on the inner faces of stationary disks 16 at the ends of the drum 6. The cams 15 are so formed that the jaws are opened as they approach the underside of the drum and are held open until after the jaws have passed the feed table 4 where a slat is fed between the jaws as will be hereinafter explained. As the jaws pass over the top of the drum and around the rear side thereof the movable jaw is moved into engagement with the slat and held in firm engagement therewith, the clamping jaws serving to firmly hold the slats while they are being operated upon by the saws and notchers.

The slats are fed to the drum by means of a reciprocating pusher 17 which is operated by arms 18 which are connected to the pusher 17 adjacent the ends thereof and are fixed to a transverse rock shaft 19 journaled in the sides of the frame adjacent the bottom thereof. The feed movement is imparted to the arms 18 by means of cams 20 carried by a transverse shaft 21 which is driven by a means which will be hereinafter described, the cams 20 serving to periodically impart a feeding movement to the pusher 17 in timed relation to the movement of the drum 6 to feed a slat to each of the clamps on the drum as they pass the feed table. In order to insure the feeding of the slats completely clear of the magazine and feed table, the pusher 17 is provided with kickers in the form of pivoted bars underlying the pusher and having upturned forward ends 22 which project slightly above the top of the pusher and are normally seated in notches in the front edge thereof. The kicker bars are L-shaped and have a forwardly extending arm 23 and adjacent the forward edge of the pusher plate 17 have arms 24 extending inwardly at right angles from the arms 23. The laterally extending arms 24 are pivoted intermediate their ends at 25 to the pusher plate and at their inner ends have upturned portions 26 which project upwardly through slots 27 in the plate, the projecting ends 26 being engaged by the ends of a leaf spring 28 which is fixed at its center to the push plate. The kicker members 22 are normally held in retracted position by the spring 28 but as the push plate approaches the forward end of its stroke, the projections 26 engage with the rear wall of the magazine 5 and are moved rearwardly with respect to the plate in opposition to the spring 28, the leverage being such that the forward ends 22 of the kickers which are in engagement with the slat are given a forward movement at a rate considerably in excess of the rate of movement of the pusher plate thereby imparting sufficient momentum of the slat which is being fed to the drum to throw the slat clear of the magazine into the space between the clamping jaws on the drum.

Immediately at the rear of the drum 6 is horizontal alignment with the shaft 7 there is a transverse shaft 29 which is journaled in the sides of the frame and carries adjacent the sides of the frame, a pair of circular saws 30 which serve to cut the slats to the proper length. Fixed to the shaft 29 at regularly spaced points between the saws 30 there are a series of notch cutters 31 which have staggered peripheral cutting teeth, the teeth 32 which are adjacent the opposite side faces of the notchers being serrated so that they act as saws and the intermediate teeth 33 which are positioned centrally of the notches being formed as chisel teeth to remove the central portions of the notches. In order to insure the proper positioning of the slats in the clamps as the slats are fed past the saws and notchers, arcuate guards 34 are rigidly supported on the frame and closely overlie the upper rear quadrant of the drum 6. In order to efficiently clamp the slats while they are being operated upon by the saws and notchers the gripping bars 11 and 12 of the clamps extend substantially to the outer edge of the slats and are provided, respectively, with notches 35 and 36 so positioned that the teeth of the notchers 31 operate in these slots as the notches are being formed in the slats. The sawdust and chips produced by the saws 30 and notchers 31 are delivered to a transversely disposed screw conveyor 37 which operates in a trough 38 directly beneath the saws and cutters, the waste material being discharged at one side of the machine through a discharge chute 39 shown in Fig. 2.

The slats after being notched are delivered to and assembled upon the endless conveyor 2 upon which they are supported transversely with their notched edges uppermost. To deliver the slats from the feed drum 6 to the conveyor 2, a second feed drum 40, similar in construction to the feed drum 6, is positioned directly beneath the drum 6. The feed drum 40 consists of end and intermediate disks 41 and 42 fixed to a transverse shaft 43 journaled at its ends in opposite sides of the frame and positioned directly beneath the shaft 7 of the drum 6, the disks 41 being rigidly connected by means of rods 44 extending longitudinally of the drum. The lower feed drum 40 is provided with slat clamping jaws similar to the clamping jaws of the drum 6 and similarly arranged about its periphery. These jaws comprise fixed abutments or jaws formed by the forward ends of notches 45 in the peripheries of the disks 41 and 42 while the movable jaws are in the form of bell crank levers similar to the levers 14, these levers being pivoted upon longitudinally extending rods 47 which are positioned inwardly of the slots 45, the rearwardly extending arms 48 of the levers carrying longitudinally extending rods 49, the ends of which project beyond the end disks 41 and engage fixed cams 50 at opposite ends of the drum. The cams 50 being so formed that the jaws are held in open position while passing through the upper rear quadrant of the drum and in closed position to retain the slat while passing around the front and lower portion of the drum. As above explained the jaws 11 and 12 of the upper drum 6 are opened as the jaws pass the lowermost portion of the drum and at this point the notched slats drop from the drum 6 into the notches 45 of the lower drum which are at this time directly beneath the upper drum. As the lower drum 41 rotates, a slat which has been dropped into the notches 45, will be carried forwardly and at the same time the movable clamping jaw 46 will be moved by the cam groove 50 into clamping engagement therewith and held in clamping engagement with the slat, while the slat is being carried around the front and bottom of the drum. As each clamp approaches the rear portion of the drum adjacent the endless conveyor 2 it is opened to permit the slat to be transferred from the drum to the endless conveyor. Means are provided at this point for positively shifting the slat from the drum to the endless conveyor and this means consists of a series of pusher arms 51 carried by a transversely extending rock shaft 52 and provided with a downwardly extending slat engaging arms 53 which in their normal position lie just within the notches 45 in which the slats are held, the arms being held in this position by a coil spring 54 connected to an arm 54ª extending forwardly from the rock shaft. As each clamp comes to a position adjacent the endless belt 2, the rear side of the depending arms 53 are engaged by one of the cross bars 44 of the drum and caused to swing forwardly about their pivots in opposition to the spring 54, the arms 53 engaging the slat and pushing the same clear of the drum and onto the conveyor. The upper and lower drums 6 and 40 are rotated at equal speeds in opposite directions. The notched slats are delivered from the upper drum to the lower drum with their notched edges lowermost the lower drum serving to reverse the slats and deliver them to the conveyor 2 with their notched edges uppermost.

The endless conveyor 2 which extends substantially throughout the entire length of the supporting frame 1 consists of side chains 55 which run over front driving sprockets 56 and over driving sprockets upon a driven shaft 57 at the rear end of the frame, the side chains 55 being connected at regularly spaced intervals by rigid metal cross slats 58 to which are attached wood spacing strips 59 which provide between adjacent strips a space just sufficient to accommodate one of the slats. The movements of the feed drums and conveyor are so timed that the notched slats are delivered between adjacent cross bars of the conveyor. The slats are supported throughout the full length of the conveyor upon suitable guide rails 60 which extend longitudinally beneath the upper run of the conveyor and have downwardly curved forward ends with which the slats are engaged as they are fed to the forward end of the conveyor. Adjacent the forward end of the conveyor means are provided for delivering a small quantity of glue into each of the notches of the slats carried by the conveyor. To this end a glue container 62 is mounted directly over the upper run of the conveyor and extends transversely across the conveyor, the glue container being supported from vertical posts 63 rigidly secured to opposite sides of the frame. The container 62 is movable vertically with respect to the supporting posts 63, the ends thereof being supported by slides 64 movable vertically in slots in the posts 63. The container 62 is provided at intervals along its length, corresponding to the spacing of the notches in the slats, with tubular discharge members 65 which extend through the bottom of the container and project downwardly therefrom to form discharge nipples from which the glue is discharged directly into the notches. The discharge members 65 are provided with lateral outlet openings 66 at their lower ends and with inlet openings 67 within the container adjacent the bottom thereof. In order to positively feed a predetermined quantity of glue into each of the notches of the slat, each of the tubular discharge members 65 has a piston 68 therein and these pistons 68 are all rigidly secured at their upper ends to a cross bar 69 slidably mounted in the end posts 63. The slides 64 which support the glue container have rigidly secured to their upper ends, rods 70 which extend through the ends of the plunger carrying cross bar 69. The cross bar 69 is slidable upon the rod 70 and is yieldably supported by springs 71 encircling the rods 70 beneath the cross bar 69, the spring 71 being supported at their lower ends upon fixed angle brackets 72 rigidly secured to the supporting posts 63. At their upper ends the rods 70 carry nuts 74 and interposed between the nuts 74 and the top of the cross bar 69 are springs 73. At the lower ends of the slides 64 and projecting outwardly therefrom are pins 75, the pins of each slide engaging with a cam 76 which has internal ratchet shaped cam teeth 77, the cam 76 at opposite sides of the frame being fixed to a transverse shaft 78 which is intermittently operated, as will be hereinafter described, to advance the cam an amount equal to the length of one of the teeth 77 thereof as each slat passes beneath the container 62. The cams are operated in the direction indicated by the arrow in Fig. 5 so that upon each actuation of the cam the slide 64 is gradually pulled downwardly until it passes the peak of the tooth 77 where it is released and allowed to move upwardly under the influence of the springs 71 and 73 until the pin 75 engages with the bottom of the succeeding notch. As each slat moves beneath the glue container 62, the container is moved downwardly by the cams until the lower ends of the nipples 65 are adjacent the bottoms of the notches and a predetermined quantity of glue is forcibly ejected into the notches as will now be explained. The plungers 68 are normally supported by the springs 71 and 73 in a position in which the lower ends of the plungers project beyond the inlet openings 67 so that glue is prevented from leaking from the interior of the container. Upon actuation of the cams, however, the glue container is carried downwardly compressing the coil springs 71 and 73 and causing the plungers 68 to have a slower downward movement within the container so that the plungers move upwardly with respect to the container and uncover the openings 67. As the pins 75 of the slides pass the peaks of the teeth 77, the slides are simultaneously released and the plungers are instantly forced downwardly with respect to the container by their springs and somewhat beyond their normal position with respect to the container rapidly ejecting a small quantity of glue from each of the discharge openings 66 into the notches of the slat. The glue having been applied to the slats they are now ready to receive the cross bars which are received in the notches thereof and means are provided a short distance to the rear of the glue applying mechanism for assembling the cross bars in the notches.

Journaled in standards 79 fixed to the side members of the frame a short distance to the rear of the glue applying device, is a transverse rock shaft 80 which is provided with radially extending pins 81 adapted to detachably engage an assembly bar 82 which has openings in one edge in which the pins 81 fit to secure the same to the rock shaft and square openings 83 in its opposite edge which have the same spacing as the notches in the slats and which are adapted to receive the cross bars $a$ which are to be placed in the notches of the slats. There will be provided a suitable number of assembly bars 82 in which the cross bars for a number of grids may be assembled, the assembly bars 82 providing means for simultaneously applying the cross bars to each grid. In order to enable the machine to assemble grids of different sizes, the supporting posts 79 are mounted for adjustment longitudinally of the frame upon side rails $79^a$ fixed to the frame. At one end the rock shaft 80 is provided with an operating handle 84 and each assembly bar 82 is provided at one end with a slightly resilient stop arm 85 which carries a set screw 86 which is adapted to engage with the upper surface of one of the rails $89^a$. The purpose of the stop arm 85 is to enable the assembly frame carrying the cross bars to be held in a substantially horizontal position above the conveyor with the cross bars carried thereby immediately above the notches of the slats passing beneath them, the set screw 86 providing means whereby the distance at which the forward ends of the cross bars are held from the slats may be regulated and the resilience of the stop arms 85 permitting sufficient additional movement of the cross bar holding member 82 to permit the cross bars to be forced down into the notches of the slats. At the rear of the assembly bar 82 a distance substantially equal to the length of the cross bars held by the bar 82 is a transverse positioning board 87 against which the forward ends of the cross bars abut when they are supported in horizontal position over the conveyor. The board 87, which is disposed in vertical position, is engaged by any of the bars which may not have been fully inserted into the supporting bar 82 whereby such bars are forced into alignment with the other bars. Immediately at the rear of the positioning board 87 there is mounted a transverse rock shaft 88 which has a series of wiper fingers 89 fixed thereto which project through slots 90 in the lower portion of the board 87, the fingers 89 being normally held in their uppermost position clear of the front face of the positioning board by means of a coiled spring 91. The rock shaft 88 is provided with an operating lever 92 which is fixed intermediate its ends to the shaft 88 and has a counterweight 93 at one end and is connected to a pedal 94 at its other end. On the front face of the board 87 there are a series of cross bar guiding projections 95 which are positioned over the spaces between the notches in the slats and are spaced from each other at their lower ends a distance equal to the width of the notches. These guide projections taper toward their upper ends and form between them guideways in which the ends of the cross bars carried by the assembly bar 82 are guided into position directly in registry with the notches into which they are to be inserted. As the conveyor is slowly moving beneath the cross bar assembly device, an assembly bar 82 carrying a set of cross bars is secured to the rock shaft 80 and turned down to a position in which the forward ends of the cross bars are positioned between the guide members 95 directly over the notches of the slats on the conveyor. An operator stationed at this point when the proper slat comes directly in line with the front of the positioning board 87 steps upon the pedal 94 rocking the shaft 88 and causing the fingers 89 to move downwardly into engagement with the forward ends of the cross bars and press them into the notches of the slats. Upon continued forward movement of the conveyor the cross bars which are loosely held in the assembly bar 82 are pulled out from the openings in the bar and the rear ends thereof drop into the notches.

Immediately to the rear of the cross bar applying device, means are provided for pressing the cross bars firmly into the notches, this pressure serving to uniformly distribute the glue through the notch. The pressure applying means consists of a pair of rollers 96 mounted above the conveyor belt and a pair of rollers 97 directly beneath the rollers 96 and beneath the conveyor belt. The rollers 96 and 97 are continuously driven and are provided with slat engaging teeth 98, the speed of rotation of the rollers and the spacing of the teeth being such that each slat is engaged during its passage between each pair of rollers by the teeth 98 thereof.

At the rear of the pressure applying rollers there is a portion 99 of the conveyor open at both sides of the frame where workmen may nail end pieces to the grids to complete the construction thereof. Adjacent the rear end of the frame, means are provided for surfacing the top surface of the completed grids and this surfacing means consists of a pair of transversely disposed sanding belts 100 and 101 which are driven at a comparatively high speed and engage with the top surface of the grids as they pass beneath them. The belts 100 and 101 are carried by rollers on longitudinally extending shafts 102 and 103 which are journaled upon opposite sides of the frame 1, the shaft 102 being carried by an adjustable support 104 by means of which the tension of the belts may be adjusted.

Having described the various operations performed upon the work and the mechanisms by means of which the operations are effected, we will now describe the driving mechanism by means of which the several mechanisms are caused to operate at the proper relative speeds and in the proper sequence.

The shaft 105 which extends transversely through the frame beneath the conveyor belt is the shaft through which the power is transmitted, this shaft being connected to a suitable motor or line shaft by means not shown herein. Fixed to opposite ends of the shaft 105 and on opposite sides of the frame are belt pulleys 106 and 107 over which run belts 108 and 109 which are crossed and extend over small pulleys 110 and 111 which are fixed to opposite ends of the shaft 29 upon which the saws and notchers are mounted. The saws and notchers are thus driven at a high rate of speed directly from the main drive shaft. Adjacent the pulley 106 at one side of the machine as shown in Fig. 2 of the drawing, the shaft 105 carries a small pulley 112 over which runs a belt 113 which drives a large pulley 114 fixed to a shaft 115 which extends transversely through the frame. At its opposite end the shaft 115 has fixed thereto a small spur gear 116 which meshes with a large spur gear 117 fixed to a transverse shaft 118 which extends through the frame forwardly of the shaft 115. This shaft 118 at the side of the frame opposite that on which the gear 117 is mounted carries a small belt pulley 119 which drives a belt 120 and through the belt 120 a large pulley 121 which is loose upon a shaft 122, the shaft 122 extending transversely through the frame at the front end thereof. The pulley 121 may be connected to the shaft 122 by means of a suitable clutch 123 controlled by a hand lever 124. The driving connections between the shaft 125 and the shaft 122 are such as to drive the shaft 122 at a speed considerably lower than that of the drive shaft and it is from the shaft 122 that the slat feeding and conveying mechanisms are driven. The shaft 122 at the end opposite that on which the pulley 121 is mounted carries a small spur gear 125 which meshes with a large spur gear 126 fixed to a short countershaft 127. The countershaft 127 carries a small spur gear 128 which meshes with a large spur gear 129 which is fixed to the shaft 43 of the lower feed drum and the gear 129 meshes with a gear 130 of exactly the same size which is fixed to the shaft 7 of the upper feed drum whereby the two feed drums are driven at exactly the same speed and in opposite directions. A small spur gear 131 fixed to the shaft 21, which carries the cams which actuate the pusher 17 to feed the slats from the magazine 5, meshes with the gear 129 on the shaft 43 of the lower feed drum, the number of teeth in the gear 131 being properly proportioned with respect to the number of teeth in the gear 129 to effect the proper timing of the delivery of slats to the upper feed drum.

The endless conveyor 2 is also driven from the shaft 122 and to this end the lower feed drum shaft 43 has fixed thereto a small gear 132 which meshes with an idler pinion 133, the idler 133 meshing with a second idler 134 which drives a large gear 134 carried by a stub shaft 136 which is journaled in the frame and in a supporting bracket 137 secured to the side of the frame. The shaft 136 carries a beveled gear 138 which meshes with a beveled gear 139 at the forward end of a longitudinal shaft 140 which extends lengthwise of the frame to the rear end thereof and carries at the rear end a beveled gear 141 which meshes with a beveled gear 142 on the shaft 57 carrying the rear sprockets of the conveyor.

It is desirable in some instances to provide a space between the grids assembled upon the endless conveyor 2. To effect this spacing of the grids on the conveyor, means may be provided for skipping the feed of one or more slats from the magazine 5 after the delivery of a predetermined number of slats therefrom in order that the slats forming each grid may be delivered in separate groups to the conveyor so that between each of the grids formed on the conveyor, there will be one or more empty slat receiving spaces on the conveyor. To provide automatically operating means for causing the pusher 17 to skip one or more feed movements, the cam shaft 21 is provided on the end opposite that to which the gear 131 is connected with an eccentric 143 to which is connected an actuating arm 144 which engages at its forward end with a ratchet 145 mounted on a shaft 146, the actuating arm 144 serving to advance the ratchet 145 one tooth upon each revolution of the cam shaft 21. Fixed to the shaft 146 beside the ratchet 145 is a cam 147 upon which bears the forward end of a lever 148 which is pivoted intermediate its ends to a bracket 149 fixed to the frame and is provided with a notch 148$^a$ adjacent its opposite end which cooperates with a latch arm 150 which is fixed to one of the pusher carrying arms 18 and has an upturned outer end 151 adapted to engage the notch 148$^a$ of the lever. The lever 148 is held in engagement with the cam by means of a spring 148$^b$ and the cam 147 has a raised portion at one part of its periphery so that at one point in the revolution of the cam the outer notched end of the lever is lowered into the path of movement of the upturned outer end 151 of the spring arm 150 so that when the pusher 11 has been advanced to the end of its stroke by the cams 20, the projection 151 will spring into the notch 148$^a$ and the pusher will be locked in its forward position until the cam 147 has been turned through a sufficient angle to release the lever. The cam 147 may be so formed as to cause the pusher to skip one feed movement or more than one feed movement. The number of teeth upon the ratchet 145 will correspond to the number of slats in the particular grid being formed by the machine. However, to form grids having a different number of slats another ratchet with the proper number of teeth may be substituted. An upwardly extending handle 152 is rigidly secured to a cross rod which is fixed to the arms 18 and this handle provides means whereby the pusher may be manually held in its forward position to skip feed or to discontinue the feed of slats.

Means are provided for intermittently actuating the glue feeding mechanism in timed relation to the movement of the slats beneath the same and this mechanism is operated directly from the pusher which feeds the slats from the magazine so that the glue feeding mechanism is operated only to feed glue into the notches of slats on the conveyor, the glue feeding mechanism being idle as empty spaces in the conveyor pass beneath it. For operating the glue feed, a rod 153 is supported adjacent one cam 76 by a roller 154 and its end is formed to engage with pins 155 which project outwardly from the outer face of the cam, the pins 155 corresponding in number and spacing with the teeth 77 of the cam. Upon each actuation of the pusher 17 by the cams 20, the rod 153 engages a pin 155 on the cam 76 and advances the cam one tooth, a yielding abutment 156 which engages certain of the pins preventing overrunning of the cam. A coiled spring 153$^a$ is connected at one end of the rod 153 and at its other end to the frame and this spring serves to return the pusher after each feed movement and to yieldingly hold the pusher supporting arms 18 in engagement with the cams 20. To enable the operation of the glue feeder to be discontinued when desired, means are provided for shifting the rod 153 to a position in which it will not engage with the pins 155 in its reciprocating movement. To this end the supporting roller 154 is carried by the forward end of a lever 157 which is pivoted intermediate its ends to the frame, the lever 157 being normally held in a position in which the rod 153 is supported in operative relation with respect to the cam by a coiled spring 158. The underside of the lever 157 at the end opposite the roller 154 is engaged by a roller 159 carried at the upper end of a lever 160 which is pivoted intermediate its ends to the frame and engages an abutment 161 to limit the movement of the lever 157 by the spring 158 at a position in which the rod 153 is operatively disposed with respect to the pins of the cam. The lever 160 is connected by a link 162 to a hand lever 163 by means of which the lever 160 may be turned about its pivot to lower the roller 154 and with it the rod 153 to a position in which the rod 153 will not engage with the pins 155 of the cam.

For driving the pressure rollers 96 and 97 the shaft 7 of the upper feed drum carries a sprocket 164 over which a sprocket chain 165 runs, the sprocket chain 165 passing over the sprocket 166 adjacent the rollers, and the rollers being driven from the sprocket 166 by suitable gearing indicated generally in Fig. 1 by the numeral 167.

The sander belts 100 and 101 being driven at a comparatively high rate of speed with respect to the movement of the conveyor and feeding mechanism are driven directly from the main drive shaft 105 by means of a belt 168 which passes over a pulley on the transverse shaft 169 adjacent the rear end of the frame. The transverse shaft 169 drives a vertical shaft 170 through gearing (not shown) and the shaft 170 has a beveled gear 171 at its upper end which meshes with a beveled gear 172 on the longitudinal shaft 103 over which the belts 100 and 101 run.

In the operation of the machine a supply of slats A will be maintained in the magazine 5 and these slats will be fed by the pusher 17 successively into the clamps of the upper feed drum 6, the slats so fed being cut to the proper length and notched during the rotation of the drum 6. It should be here noted that the saws 30 and notchers 31 are adjustably and detachably mounted upon the shaft 29 so that the slats may be cut to the desired length and the notches may be spaced as desired along the length of the slat. After being sawed to length and notched, the slats are delivered from the upper feed drum 6 to the clamps of the lower feed drum 40 and during the rotation of the feed drum 40, are delivered with their notches uppermost into successive spaces between the slats of the endless conveyor 2. The skip feed mechanism above described provides means whereby the slats may be delivered in groups of the desired number upon the conveyor with one or more empty spaces between the groups. As the conveyor moves slowly rearwardly under the glue container, the cams 76 are actuated to actuate the glue feeding mechanism to deliver a small quantity of glue into each of the notches of each slat as it passes beneath the glue receptacle. When the machine is first started into operation and until the first slat reaches the glue feeding device, the cam actuating rod 153 will be held in inoperative position. As the first slat reaches the glue container the cam actuating rod 153 will be shifted to operative position and thereafter will operate to feed glue into the notches of each slat that passes beneath the glue container. The glue feeder being operated directly from the slat feeder will skip an operation at the same time as empty spaces on the conveyor pass beneath it. After passing the glue feeding device the slats are carried rearwardly beneath the cross bar assembling and applying devices where the cross bars a of the grid are inserted into the notches. It should be here noted that the glue feeding device and cross bar inserting devices are readily removable and may be replaced by other devices adapted to cooperate with slats of a different length and slats in which the spacing of the notches is different. After the cross bars a have been inserted into the notches of the slats A, the slats and cross bars are carried between the pressure applying rollers 96 and 97 which serve to press the cross bars firmly into the notches after which the partially assembled grids are carried along the open portion 99 of the conveyor where workmen at each side of the frame can nail on the end pieces of the grid. The completed grids then pass beneath the sander belts 100 and 101 which produce a smooth surface on the top of the grid, the completed grids then being discharged from the rear end of the conveyor.

Having described my invention, I claim:

1. In a machine of the character described, a slat carrier, a notch cutter adapted to notch a slat held by the carrier, a conveyor, and means for delivering a slat from the carrier to the conveyor with the notched side thereof outward.

2. In a machine of the character described, a magazine for slats, a slat carrier, means for delivering the slats from the magazine to the carrier, slat notching mechanism associated with the carrier and adapted to cut notches in the slats, a conveyor having slat holding means at spaced intervals, and means for delivering the slats from the notching mechanism to the conveyor with the notches outward.

3. A grid forming machine comprising slat notching mechanism, a conveyor having cross bars spaced to receive slats between them and means for delivering the slats from the notching mechanism into the spaces between successive cross bars of the conveyor with their notched sides outward.

4. In a machine of the character described, a carrier having clamps adapted to hold slats, a notch cutter, means for operating the carrier to move the slats carried thereby successively into engagement with the notch cutter, a conveyor adapted to receive the notched slats and means for delivering the slats from said carrier to the conveyor with the notched sides thereof outward.

5. In a machine of the character described, a rotary carrier provided with spaced slat receiving clamps, a notch cutter engageable with the slats during rotation of the carrier, a conveyor adapted to receive the notched slats and a second carrier adapted to receive the slats from the first carrier and deliver them to the conveyor with the notches outward.

6. A grid forming machine comprising a slat magazine, means for sawing the slats to length and cutting notches therein, means for feeding the slats from the magazine to the notching and sawing means, an endless conveyor having means for supporting the slats in regularly spaced relation thereon, and means for delivering the slats to the conveyor with their notches outward.

7. In a machine of the character described, a rotary feed drum having spaced peripheral slat receiving notches, slat clamping means associated with each of said notches, a notch cutter alongside the drum positioned to engage with the slats gripped by the clamps of said drum, a conveyor having spaced slat receiving portions and means for delivering slats from said drum to said conveyor with their notched sides outward.

8. In a machine of the character described, a slat magazine, a rotary feed drum having spaced slat holding clamps, means associated with said drum for opening and closing the clamp, means for feeding the slats from said magazine to the clamps of said drum, a notch cutter alongside the drum positioned to engage with the slats gripped by the clamps of said drum, an endless conveyor and means for delivering the slats from said drum to said conveyor with their notched sides outward.

9. In a machine of the character described, a rotary feed drum having spaced peripheral slat receiving notches, slat clamping means associated with said notches, a notch cutter alongside the drum positioned to engage with the slats gripped by the clamps of said drum, a second feed drum, said second feed drum having peripheral notches and slat clamping means associated with the notches, means for operating the clamps of said drums to permit the slats to pass from the first drum into the notches of the second drum and a conveyor adapted to receive the slats from the second drum.

10. In a machine of the character described, a rotary feed drum having spaced peripheral slat holding clamps, means associated with said drum for holding said clamps open as they pass around one side of the drum and closed during the remainder of the revolution, a notch cutter alongside the drum positioned to engage with the slats gripped by the clamps of said drum, a second feed drum having peripheral clamps and means for holding the clamps open as they pass around one side of the drum, means for driving said drums in opposite directions, and a conveyor positioned to receive the slats discharged from said second drum.

11. In a machine of the character described, a rotary feed drum having spaced peripheral slat holding clamps, means associated with the drum for holding the clamps open as they pass around one side of the drum and closed during the remainder of the revolution, a notch cutter alongside the drum positioned to engage with the slats gripped by the clamps of said drum, a second feed drum having peripheral clamps and means for holding the clamps open as they pass around one side, means for driving said drums in opposite directions at speeds such that each clamp of the sceond drum as it passes a given point registers with a clamp of the first drum and a conveyor positioned to receive the slats discharged from the said second drum, said conveyor having spaced means adapted to receive between them slats discharged from said second drum.

12. In a machine of the character described, a slat magazine, a notch cutter, a carrier for feeding slats to the cutter, means for feeding the slats at predetermined intervals from the magazine to the carrier, and means for interrupting the operation of the feeding means at predetermined intervals.

13. In a machine of the character described a slat magazine, a notch cutter, a slat carrier for feeding slats to the cutter, said carrier having thereon at spaced intervals, means for holding a slat, a feeder associated with the magazine operable to deliver slats from the magazine to said slat holding means successively and means operable after a predetermined number of slats have been fed from the magazine to interrupt the operation of the feeder.

14. In a machine of the character described, a slat magazine, a notch cutter, a continuously moving carrier for feeding slats to the cutter, said carrier having thereon spaced slat receiving and holding means, a feeder operable intermittently to deliver slats from the magazine to successive slat holding means on the carrier, and means acting automatically upon said feeder to temporarily interrupt the operation thereof and cause the same to skip certain predetermined feed movements.

15. A grid forming machine comprising slat notching, glue applying and cross bar inserting devices and slat conveying means associated with said devices and cooperating successively therewith to form the grids.

16. A grid forming machine comprising a slat magazine, slat notching mechanism, means for feeding the slats from the magazine to the slat notching mechanism, glue applying and cross bar inserting devices and means for conveying the slats from the notching mechanism to the glue applying and cross bar inserting devices.

17. A grid forming machine comprising a magazine, a slat notching mechanism, means for feeding the slats from the magazine to the notching mechanism, a conveyor, means for delivering the slats from the notching mechanism to the conveyor, means for applying glue to the notches of the slats while on the conveyor and means associated with the conveyor for inserting cross bars into the notches of the slats.

18. A grid forming machine comprising slat notching, glue applying and cross bar inserting mechanisms and feeding means including a conveyor for carrying the slats successively past said mechanisms.

19. A grid forming machine comprising a slat magazine, a slat notching mechanism, a conveyor, means for feeding the slats from the magazine to the notching mechanism and for assembling the slats upon the conveyor, glue applying and pressure applying devices positioned along the conveyor and adapted to operate successively upon the slats carried by the conveyor to form the grids.

20. A grid forming machine comprising a slat magazine, slat notching mechanism, a conveyor, means for feeding the slats from the magazine to the notching mechanism and delivering the notched slats in groups to the conveyor, means along the length of the conveyor for applying glue to the notches of the slats and for inserting cross bars in said notches, pressure applying means acting upon the assembled slats and cross bars and an abrading device associated with the conveyor at the rear of the pressure applying device for surfacing the assembled grids.

21. A grid forming machine comprising slat notching mechanism, a conveyor having means thereon for supporting slats in parallel and regularly spaced relation, means for feeding the slats to the slat notching mechanism and for delivering the same to said conveyor with their notches outward and means associated with said conveyor for inserting cross bars into the notches of said slats.

22. A grid forming machine comprising slat notching mechanism, a conveyor having means thereon for holding slats in parallel regularly spaced relation with their notches in alignment, means for feeding the slats past the notching mechanism and for delivering the notched slats to said conveyor with their notched sides outward and means associated with said conveyor for simultaneously inserting cross bars into all of the notches of a group of slats thereon.

23. A grid forming machine comprising slat notching mechanism, a conveyor, means for feeding the slats to the notching mechanism and for assembling the slats in parallel relation with their notches outward upon said conveyor, glue feeding means mounted above said conveyor and means for operating said glue feeding means to apply glue to each of the notches of each of the slats as they pass beneath the glue applying device.

24. A grid forming machine comprising a slat magazine, slat notching mechanism, a carrier for feeding slats to the notching mechanism, an intermittently operating feeder for delivering the slats one at a time from the magazine to the carrier, a conveyor having means for supporting slats in regularly spaced parallel relation, means for delivering the slats from said carrier to said conveyor with their notched sides outward, an intermittently operated glue applying device associated with said conveyor, and means for operating said glue applying device to deliver glue into the notches of each of the slats on the conveyor, said glue applying device being operated by said feeder.

25. A grid forming machine comprising a slat magazine, slat notching mechanism, a carrier for feeding slats to said notching mechanism, an intermittently operating feeder for delivering slats from the magazine to said carrier, a conveyor having means thereon for supporting slats in parallel regularly spaced relation, a glue feeder associated with said conveyor, means for operating said feeder to deliver glue into the notches of successive slats on the conveyor and means for causing said glue applying device to skip an operation at predetermined intervals.

26. A grid forming machine comprising a magazine for holding a supply of slats, means for forming spaced notches in the slats, means for feeding the slats from the magazine to the notch forming means, a conveyor having means for supporting the slats in parallel spaced relation, means for delivering the notched slats to the conveyor with the notched side uppermost, means associated with the conveyor for discharging adhesive material into the notches, means applying cross bars to the slats in the notches thereof, and means associated with the conveyor for pressing the cross bars into the notches.

27. A grid forming machine comprising a magazine for holding a supply of slats, a carrier adjacent the magazine and having means for holding slats, means for feeding the slats one at a time from the magazine to the carrier, notch cutters positioned to operate on slats held by said carrier, a conveyor having spaced slat receiving portions, means for delivering the slats to the carrier with the notches outward, glue applying means associated with the conveyor and means for assembling cross bars in the notches of the slats on said conveyor.

28. A grid forming machine comprising slat notching mechanism, an endless conveyor having cross bars spaced to receive a slat between adjacent bars, means for delivering slats from the notching mechanism to the spaces between successive cross bars of the conveyor with their notched sides uppermost, means above said endless conveyor for applying glue to the notches of said slats and for inserting cross bars into the slats on the conveyor.

29. A grid forming machine comprising slat notching mechanism, an endless conveyor having cross bars spaced to receive a slat between adjacent bars, means for delivering slats from the notching mechanisms to the successive spaces between the cross bars of the conveyor, and means along the length of the conveyor for applying glue to the notches of the slats and for inserting cross bars into the notches, said conveyor having a space at the rear of said devices accessible from the opposite sides thereof for the application of the end members to the grids.

30. A grid forming machine comprising slat notching mechanism, an endless conveyor having cross bars spaced to receive a slat between adjacent bars, means for delivering slats from the notching mechanisms to the successive spaces between the cross bars of the conveyor, means along the length of the conveyor for applying glue to the notches of the slats and for inserting cross bars into the notches, said conveyor having a space at the rear of said devices accessible from the opposite sides thereof for the application of the end members to the grids and means associated with the conveyor for surfacing the assembled grids.

In testimony whereof, I hereunto affix my signature.

FREDRICK A. COFFEEN.